US 9,558,344 B2

(12) United States Patent
Childress et al.

(10) Patent No.: US 9,558,344 B2
(45) Date of Patent: Jan. 31, 2017

(54) PROXIMITY BASED AUTHENTICATION FOR STRIPED DATA

(71) Applicant: International Business Machines Corporation, Armonk, NY (US)

(72) Inventors: Rhonda L. Childress, Austin, TX (US); Itzhack Goldberg, Hadera (IL); Clifford A. Pickover, Yorktown Heights, NY (US); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/661,079

(22) Filed: Mar. 18, 2015

(65) Prior Publication Data

US 2016/0275285 A1   Sep. 22, 2016

(51) Int. Cl.
   *G06F 21/00*   (2013.01)
   *G06F 21/44*   (2013.01)
   *H04W 12/06*   (2009.01)

(52) U.S. Cl.
   CPC .............. *G06F 21/44* (2013.01); *H04W 12/06* (2013.01)

(58) Field of Classification Search
   CPC ........................................................ G06F 21/44
   See application file for complete search history.

(56) References Cited

U.S. PATENT DOCUMENTS

| | | | |
|---|---|---|---|
| 7,181,228 B2 * | 2/2007 | Boesch | G01S 5/0027 340/539.15 |
| 7,418,548 B2 * | 8/2008 | Corrado | G06F 3/0605 711/114 |
| 7,673,098 B2 | 3/2010 | Howard et al. | |
| 7,733,913 B1 | 6/2010 | Cheung et al. | |
| 7,769,887 B1 * | 8/2010 | Bhattacharyya | H04L 67/2861 709/238 |
| 8,407,759 B1 * | 3/2013 | Sotos | H04L 69/14 370/328 |
| 8,532,074 B2 | 9/2013 | Navda et al. | |

(Continued)

OTHER PUBLICATIONS

Kerner, Sean Michael, "Startup Sookasa Aims to Secure Dispersed Cloud Files", eWeek, Posted Apr. 2, 2014, <http://www.eweek.com/security/startup-sookasa-aims-to-secure-dispersed-cloud-files.html>.

(Continued)

*Primary Examiner* — Izunna Okeke
*Assistant Examiner* — Ali Shayanfar
(74) *Attorney, Agent, or Firm* — Christopher McLane; Daniel R. Simek (57) ABSTRACT

An approach for authentication is provided. The approach performs identifying, by one or more computer processors, an account attempting to access striped data. The approach performs identifying, by one or more computer processors, one or more computing devices that are associated with the account. The approach performs determining, by one or more computer processors, a distance from a first computing device of the identified one or more computing devices to a second computing device of the identified one or more computing devices. The approach performs determining, by one or more computer processors, whether the distance from the first computing device to the second computing device is within a threshold proximity. The approach further grants or denies access to striped data based on threshold proximity being met or exceeded.

17 Claims, 5 Drawing Sheets

(56) References Cited

U.S. PATENT DOCUMENTS

| | | | |
|---|---|---|---|
| 8,595,595 B1* | 11/2013 | Grcanac | G06F 11/1092 714/6.2 |
| 8,595,810 B1* | 11/2013 | Ben Ayed | H04L 63/0815 713/168 |
| 8,855,665 B2* | 10/2014 | Buford | H04L 63/107 455/404.2 |
| 8,862,561 B1 | 10/2014 | Nesbit et al. | |
| 8,964,947 B1* | 2/2015 | Noolu | H04M 3/541 379/88.01 |
| 9,092,969 B2* | 7/2015 | McCown | G08B 21/00 |
| 2008/0011827 A1 | 1/2008 | Little et al. | |
| 2010/0225443 A1* | 9/2010 | Bayram | G06F 21/316 340/5.83 |
| 2012/0079129 A1 | 3/2012 | Rensin et al. | |
| 2013/0152216 A1 | 6/2013 | Stevens | |
| 2013/0196590 A1* | 8/2013 | Fyke | H04W 8/24 455/3.01 |
| 2013/0335273 A1* | 12/2013 | Pakzad | G01C 21/206 342/458 |
| 2014/0010135 A1 | 1/2014 | Navda et al. | |
| 2014/0026208 A1* | 1/2014 | Coons | G06K 9/00107 726/16 |
| 2014/0143220 A1 | 5/2014 | Foster | |
| 2014/0189015 A1* | 7/2014 | Chan | G06Q 10/107 709/204 |
| 2014/0281138 A1* | 9/2014 | Karamcheti | G06F 12/0246 711/103 |
| 2014/0317235 A1* | 10/2014 | Oh | H04L 29/0809 709/218 |
| 2014/0378056 A1* | 12/2014 | Liu | H04W 4/008 455/41.2 |
| 2015/0082406 A1* | 3/2015 | Park | H04L 63/0853 726/9 |
| 2015/0128292 A1* | 5/2015 | Malecki | G06F 21/31 726/28 |
| 2015/0271163 A1* | 9/2015 | Greenspan | H04L 63/08 713/168 |
| 2016/0094963 A1* | 3/2016 | Gupta | H04W 4/206 705/7.19 |

OTHER PUBLICATIONS

Pash, Adam, "How Many Gadgets Do You Carry?", Lifehacker, Aug. 23, 2011, <http://lifehacker.com/5833625/how-many-gadgets-do-you-carry>.

Shankland, Stephen, "Cleversafe updates distributed storage idea", CNET, Updated Oct. 17, 2007, <http://www.cnet.com/news/cleversafe-updates-distributed-storage-idea/>.

"Collaboration between filesystem and storage controllers to improve performance and simplify deployment via enforced data striping", An IP.com Prior Art Database Technical Disclosure, IP.com No. 000225208, Published Jan. 30, 2013.

"SanDisk Connect Wireless Flash Drive", Copyright © 2014 SanDisk Corporation, <http://www.sandisk.com/products/wireless/flash-drive/>.

"Secure Mobile Desktop for MobileIron", SAT, Nov. 11, 2013, © 2013 Secure Access Technologies, <http://www.secureaccesstechnologies.com/partners-mobileiron.htm>.

"Realtime P2P communication between mobile devices", Stack Overflow, Edited Aug. 22, 2012, <http://stackoverflow.com/questions/12059822/realtime-p2p-communication-between-mobile-devices>.

"Raid systems what are they good for??", Ubuntu Forums, Feb. 20, 2009, <http://ubuntuforums.org/archive/index.php/t-1074936.html>.

"Data striping", From Wikipedia, the free encyclopedia, last modified Oct. 28, 2014, <http://en.wikipedia.org/wiki/Data_striping>.

* cited by examiner

PROXIMITY BASED AUTHENTICATION FOR STRIPED DATA

TECHNICAL FIELD

The present invention relates generally to data striping, and more particularly to granting or denying access to striped data based on a computing device's location in reference to another computing device's location.

BACKGROUND

In computer data storage, data striping is a technique for segmenting logically sequential data (e.g., a file) so that consecutive segments are stored on different physical storage devices. Striping may be useful when a processing device requests data more quickly than a single storage device can provide it. Spreading segments across multiple devices that can be accessed concurrently may increase total data throughput. Data striping may also be a useful method for balancing input/output (I/O) load across an array of disks. Striping is used across disk drives in redundant array of independent disks (RAID) storage, network interface controllers, different computers in clustered file systems and grid-oriented storage, and random access memory (RAM) in some systems.

SUMMARY

Aspects of the present invention provide an approach for authentication, in accordance with an embodiment of the present invention. In one aspect, a method includes identifying, by one or more computer processors, an account attempting to access striped data. The method includes identifying, by one or more computer processors, one or more computing devices that are associated with the account. The method includes determining, by one or more computer processors, a distance from a first computing device of the identified one or more computing devices to a second computing device of the identified one or more computing devices. The method includes determining, by one or more computer processors, whether the distance from the first computing device to the second computing device is within a threshold proximity.

In another aspect, a computer program product includes program instructions to identify an account attempting to access striped data. The computer program product includes program instructions to identify one or more computing devices that are associated with the account. The computer program product includes program instructions to determine a distance from a first computing device of the identified one or more computing devices to a second computing device of the identified one or more computing devices. The computer program product includes program instructions to determine whether the distance from the first computing device to the second computing device is within a threshold proximity.

In yet another aspect, a computer system includes program instructions to identify an account attempting to access striped data. The computer system includes program instructions to identify one or more computing devices that are associated with the account. The computer system includes program instructions to determine a distance from a first computing device of the identified one or more computing devices to a second computing device of the identified one or more computing devices. The computer system includes program instructions to determine whether the distance from the first computing device to the second computing device is within a threshold proximity.

In yet another aspect, a method for deploying a system for authentication includes providing a computer infrastructure being operable to identify, by one or more computer processors, an account attempting to access striped data. The method includes identifying, by one or more computer processors, one or more computing devices that are associated with the account. The method includes determining, by one or more computer processors, a distance from a first computing device of the identified one or more computing devices to a second computing device of the identified one or more computing devices. The method includes determining, by one or more computer processors, whether the distance from the first computing device to the second computing device is within a threshold proximity.

In yet another aspect, in response to determining that the distance from the first computing device to the second computing device is within a threshold proximity, granting, by one or more computer processors, access to the striped data.

In yet another aspect, in response to determining that the distance from the first computing device to the second computing device is within a threshold proximity, granting, by one or more computer processors, access to the striped data.

In yet another aspect, wherein determining a distance from a first computing device to a second computing device includes determining, by one or more computer processors, a distance from a first computing device to a second computing device based on whether the first computing device and the second computing device are capable of communicating via a wireless personal area network (WPAN). The method includes wherein the determined distance is within the threshold proximity if the first computing device and the second computing device are capable of communicating utilizing a WPAN. The method includes wherein the determined distance exceeds the threshold proximity if the first computing device and the second computing device are not capable of communicating utilizing a WPAN.

In yet another aspect, the method includes determining whether a quorum of computing devices are within a threshold proximity of one another. The method includes identifying the computing devices associated with the account. The method includes determining, by one or more computing devices, whether a preset number of the computing devices associated with the account are within a threshold proximity of one another.

DETAILED DESCRIPTION

Embodiments of the present invention recognize that it may be beneficial to store data across multiple devices to increase data throughput. Embodiments of the present invention recognize that storing data on a singular device can create a risk to data if the device is breached or stolen.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
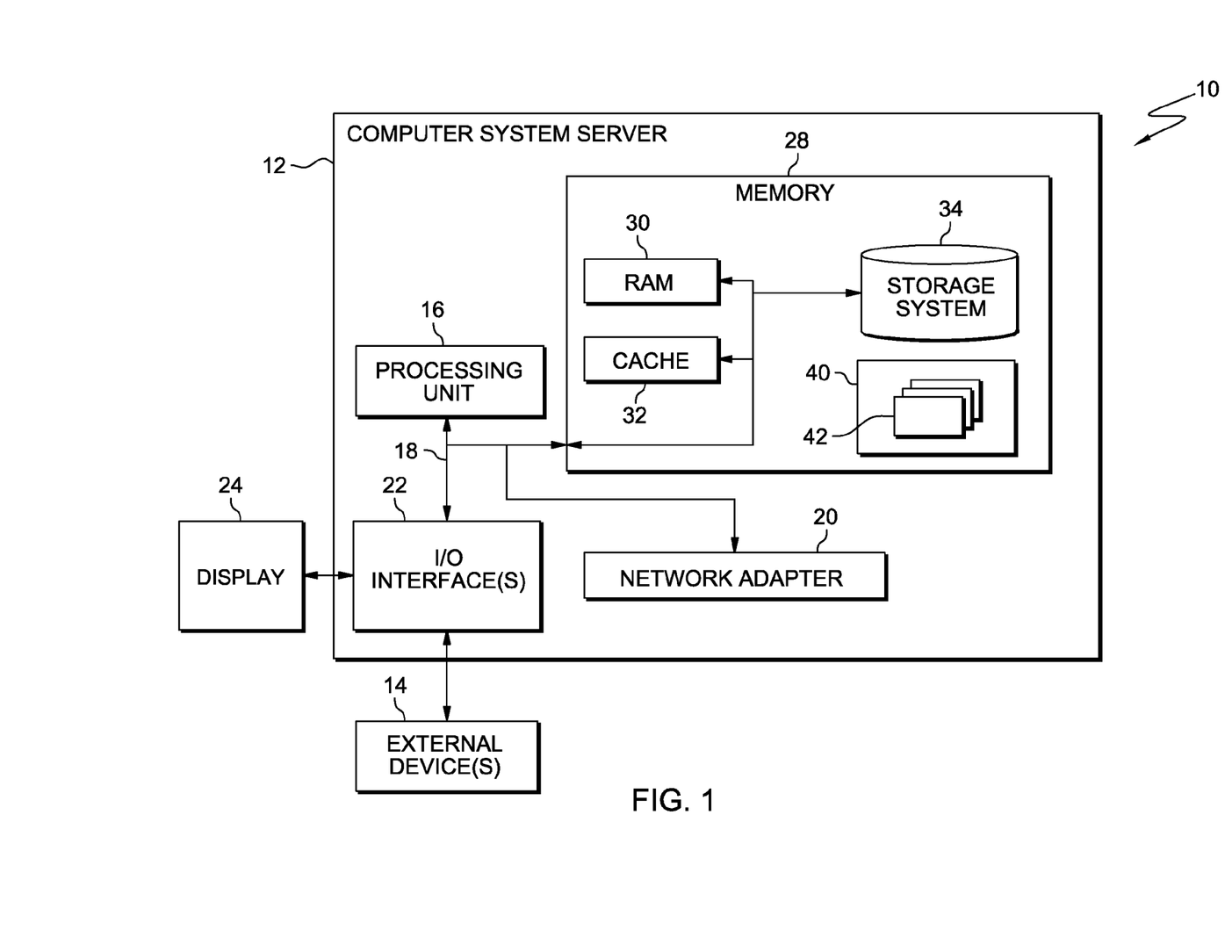
FIG. 1 depicts a cloud computing node, in accordance with an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system server 12, which is operational with numerous other general purpose or special purpose computing system environments or configurations. Examples of well-known computing systems, environments, and/or configurations that may be suitable for use with computer system server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices and the like.

Computer system server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system server 12 may be practiced in distributed cloud computing environments where tasks are performed by remote processing devices that are linked through a communications network. In a distributed cloud computing environment, program modules may be located in both local and remote computer system storage media including memory storage devices.

The present invention will now be described in detail with reference to the Figures.

As shown in FIG. 1, computer system server 12 in cloud computing node 10 is shown in the form of a general-purpose computing device. The components of computer system server 12 may include, but are not limited to, one or more processors or processing units 16, a system memory 28, and a bus 18 that couples various system components, including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system server 12 typically includes a variety of computer system readable media. Such media may be any available media that is accessible by computer system server 12, and it includes both volatile and non-volatile media, removable and non-removable media.

System memory 28 can include computer system readable media in the form of volatile memory, such as random access memory (RAM) 30 and/or cache memory 32. Computer system server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk, such as a CD-ROM, DVD-ROM or other optical media, can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system server 12 may also communicate with one or more external devices 14, such as a keyboard, a pointing device, a display 24, etc.; one or more devices that enable a user to interact with computer system server 12; and/or any devices (e.g., network card, modem, etc.) that enable computer system server 12 to communicate with one or more other computing devices. Such communication can occur via Input/Output (I/O) interfaces 22. Still yet, computer system server 12 can communicate with one or more networks, such as a local area network (LAN), a general wide area network (WAN), and/or a public network (e.g., the Internet) via network adapter 20. As depicted, network adapter 20 communicates with the other components of computer system server 12 via bus 18. It should be understood that although not shown, other hardware and/or software components could be used in conjunction with computer system server 12. Examples, include, but are not limited to: microcode, device drivers, redundant processing units, external disk drive arrays, RAID systems, tape drives, and data archival storage systems, etc.

Figure 2:
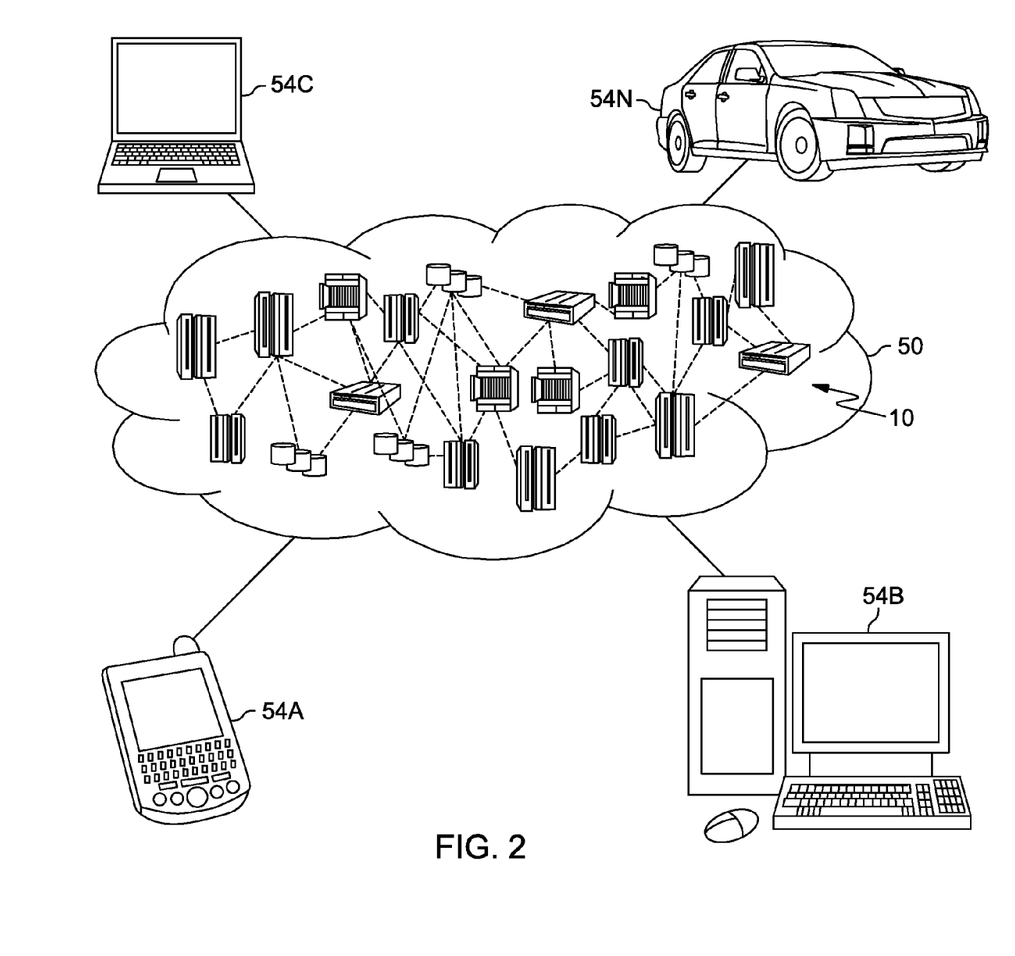
FIG. 2 depicts a cloud computing environment, in accordance with an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser).

Figure 3:
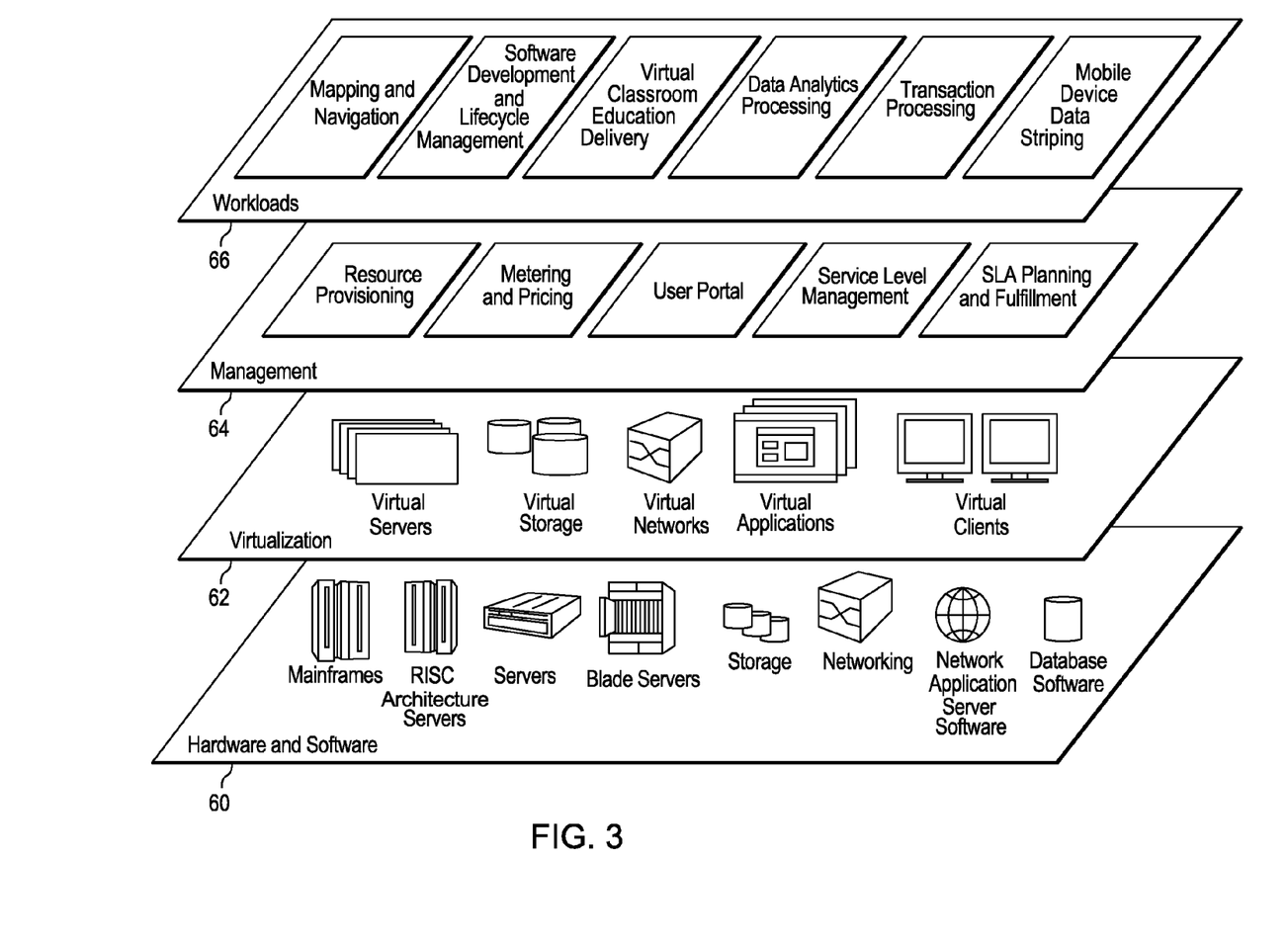
FIG. 3 depicts abstraction model layers, in accordance with an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer); architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated, in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile device data striping.

Figure 4:
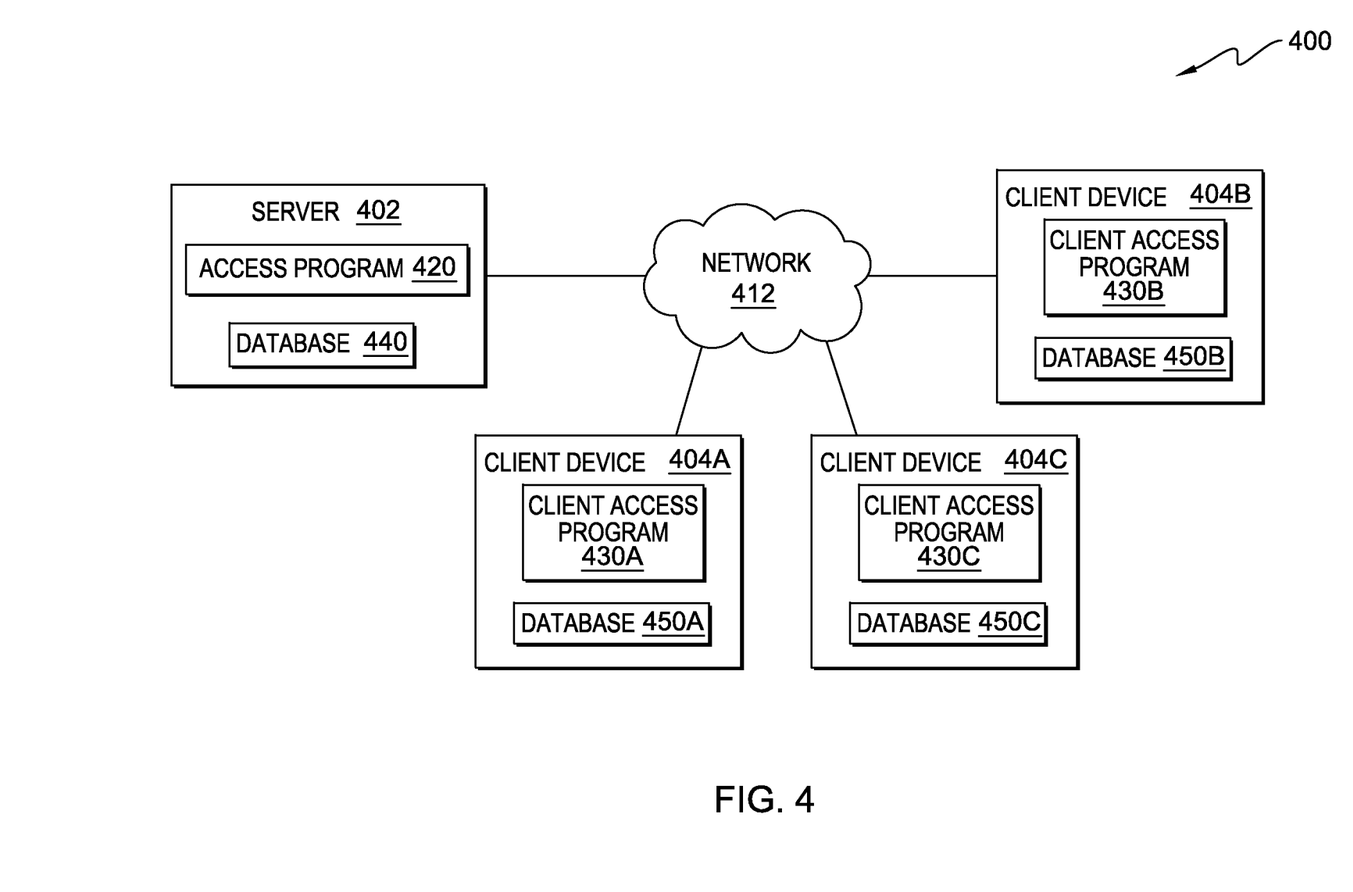
FIG. 4 is a functional block diagram illustrating a distributed data processing environment, in accordance with an embodiment of the present invention.

FIG. 4 is a functional block diagram illustrating a data processing environment, generally designated 400, in accordance with one embodiment of the present invention. FIG. 4 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

Distributed data processing environment 400 includes server 402 and client devices 404A-C, all interconnected over network 412. Network 412 represents, for example, a telecommunications network, a local area network (LAN), a wide area network (WAN), such as the Internet, or a combination of the three, and includes wired, wireless, and/or fiber optic connections. Network 412 includes one or more wired and/or wireless networks that are capable of receiving and transmitting data, voice, and/or video signals, including multimedia signals that include voice, data, and video information.

In the depicted environment, server 402 is one or more of a management server, a web server, or any other electronic device or computing system capable of receiving, analyzing, and sending data. In this embodiment, server 402 determines access to data based on the proximity a client device has to one or more other client devices. In other embodiments, server 402 represents a server computing system utilizing multiple computers as a server system, such as in a cloud computing environment. In an example, server 402 can be cloud computing node 10. In another embodiment, server 402 represents a laptop computer, a tablet computer, a netbook computer, a personal computer (PC), a desktop computer, a personal digital assistant (PDA), a smart phone, or any programmable electronic device capable of communicating with client device via network 412. In another embodiment, server 402 represents a computing system utilizing clustered computers and components to act as a single pool of seamless resources. Server 402 may include components as depicted and described in further detail with respect to FIG. 1, in accordance with embodiments of the present invention. Server 402 includes access program 420 and database 440.

In depicted distributed data processing environment 400, access program 420 resides on server 402 and grants or denies access to data based on the proximity a client device has to one or more other client devices. In various embodiments, access program 420 receives data from a client device and stripes the data to one or more other client devices, which make up a group of client devices. In these embodiments, access program 420 grants or denies access to the striped data based about the proximity of a client device to the one or more other client devices. In an example, a client device (e.g., client device 404A) is one of three client devices (e.g., client devices 404A-C) that have data striped to them. In this example, if any one of the client devices is outside a threshold proximity (e.g., 10 mile radius), then access program 420 does not grant the client device access to any of the striped data. In computer data storage, data striping is the technique of segmenting logically sequential data, such as a file, so that consecutive segments are stored on different physical storage devices. Striping is useful when a processing device requests data more quickly than a single storage device can provide it. Spreading segments across multiple devices that can be accessed concurrently can increase total data throughput. Striping is used across disk drives in redundant array of independent disks (RAID) storage, network interface controllers, different computers in clustered file systems and grid-oriented storage, and random access memory (RAM) in some systems.

In some embodiments, the number of client devices that are within a proximity distance of each other compared to the total number of client devices that have had data striped to the device may be a factor in granting or denying access to the striped data. In various embodiments, encryption is also utilized on the striped data. In other embodiments, access program 420 can utilize usernames and passwords in conjunction with a proximity threshold, as well the possibility to override the requirement for a proximity threshold. Access program 420 is depicted and described in further detail with respect to FIGS. 5 and 6.

In the depicted embodiment, database 440 resides on server 402. In another embodiment, database 440 may reside elsewhere in distributed data processing environment 400, such as within server 402, client devices 404 A-C, or independently as a standalone database that is capable of communicating with server 402, and/or client devices 404 A-C via network 412. A database is an organized collection of data. Database 440 is implemented with any type of storage device capable of storing data that is accessed and utilized by server 402, and client devices 404 A-C, such as a database server, a hard disk drive, or a flash memory. In other embodiments, database 440 represents multiple storage devices within server 402. Database 440 stores information such as user names, accounts, passwords, proximity thresholds, the amount of client devices belonging to an account, striped data, the amount of client devices needed to grant access for an account (e.g., a quorum), encryption information, etc. In an example, database 440 stores a proximity threshold comprising a radius from a central point of client devices belonging to an account. In another example, a large portion of striped data is stored in database 440 as not to take up all available database storage on client devices 404A-C.

In the depicted embodiment, client devices 404A-C are one or more of a desktop computer, a laptop computer, a tablet computer, a specialized computer server, a smart phone, or any programmable electronic device capable of communicating with server 402 via network 412 and with various components and devices within distributed data processing environment 400. In an example, client devices 404A-C can each be a node, such as cloud computing node 10. In general, client devices 404A-C represent any programmable electronic device or combination of programmable electronic devices capable of executing machine readable program instructions and communicating with other computing devices via a network, such as network 412. Client devices 404A-C may include components as depicted and described in further detail with respect to FIG. 1, in accordance with embodiments of the present invention.

In an embodiment, client device 404A sends data to server 402 via network 412 for striping to other client devices (e.g., client device 404B and C) by access program 420 or another data striping program not depicted. In various embodiments, client devices 404A-C may represent a collection of computing devices (e.g., cellular phone, desktop computer, tablet, etc.), which may belong to one person, department, company, etc. In an example, client device 404A is one of three cellular phones, which are owned by the same user or entity as client devices 404B and C. In another embodiment, client device 404A requests access to data that has been striped to other client devices (e.g., client device 404B and C), and access program 420 either grants or denies access client device 404A to the striped data. In an example, client device 404A requests access to striped data from access program 420 and is either granted or denied access to the striped data depending on the proximity of client devices (e.g., client devices 404A-C) belonging to an account for the user of client device 404A. Client devices 404A-C contain client access programs 430A-C and databases 450A-C respectively.

In depicted distributed data processing environment 400, client access programs 430A-C reside on client devices 404A-C respectively and requests access to data that has been striped to other client devices. In an embodiment, client access programs 430A-C may receive data from a user and stripe the data to other client devices (e.g., client devices 404B and C). In another embodiment, a client access program (e.g., client access program 430A) may send data to access program 420, which then stripes the data to some or all client devices and client access programs (e.g., client access programs 430B and C) belonging to the same account as the client access program (e.g., client access program 430A). In various embodiments, client access programs 430A-C may not stripe data but rather send and receive data related to granting or denying access to striped data located on at least one client device (e.g., client devices 404A-C) or a server (e.g., server 402). In an example, client access program 430A sends information that may comprise a location, username, password, request for a specific file which has been striped, etc.

In the depicted embodiment, databases 450A-C reside on client devices 404A-C respectively. In another embodiment, databases 450A-C may reside elsewhere in distributed data processing environment 400, such as within server 402 or independently as a standalone database that is capable of communicating with server 402 and/or client devices 404A-C via network 412. A database is an organized collection of data. Databases 450A-C are implemented with any type of storage device capable of storing data that is accessed and utilized by server 402 and client devices 404A-C, such as a database server, a hard disk drive, or a flash memory. In other embodiments, databases 450A-C represent multiple storage devices within client devices 404A-C. Databases 450A-C store information, such as user names, accounts, passwords, proximity thresholds, the amount of client devices belonging to an account, striped data, the amount of client devices needed to grant access for an account, encryption information, etc. In an example, database 450A stores a piece of data that has been striped from a larger collection of data and distributed across multiple devices or databases (e.g., databases 450A-C). In another example, databases 450A-C may include striped data that has been encrypted as well as the location of the computing device (e.g., client devices 404A-C) and any passwords stored for client access programs 430A-C.

Figure 5:
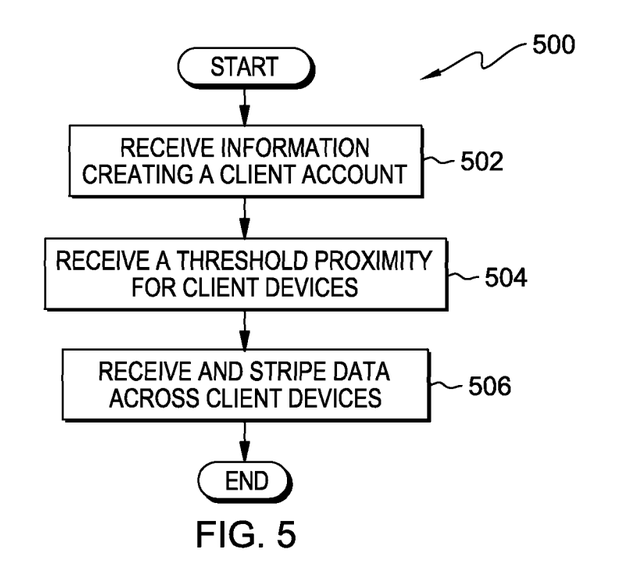
FIG. 5 is a flowchart depicting operational steps of a program, in accordance with an embodiment of the present invention.

FIG. 5 depicts flowchart 500, showing a function of access program 420, in accordance with an embodiment of the present invention. Access program 420 operates on server 402 and creates user accounts and access parameters for striped data. In various embodiments, access and account information for access program 420 may be created during the initial account setup when any changes are made to the account (e.g., adding computing devices to an account) and/or when new data is received by access program 420. In one embodiment, a user initiates the operational steps of access program 420 the first time a user of a client device (e.g., client device 404A) sets up an account with access program 420. In another embodiment, access program 420 may initiate the operational steps of access program 420 after a set amount of days. In yet another embodiment, access program 420 may initiate in response to a client device (e.g., client device 404A) attempting to access an instance of striped data. In some embodiments, access program 420 may be a function of client access programs 430A-C communicating via a peer to peer network.

Access program 420 receives information creating a client account (step 502). In various embodiments, access program 420 receives data from a client device (e.g., client device 404A) creating an account for access program 420. In an example, access program 420 receives data indicating the creation of a new account from client access program 430A. In this example, client access program 430A provides data indicating the number of client devices (e.g., client devices 404A-C) that belong to the account. In another embodiment, access program 420 determines that a client device, which is not a member of an account, frequently communicates with the devices that are registered to an account for access program 420. In this embodiment, access program 420 may send a request to client access programs 430A-C prompting a user of client access programs 430A-C to indicate if the client device should be added to the account. For example, client devices 404A-C frequently communicate with each other. Client devices 404A and B are members of the same account for access program 420, but client device 404C is not. Access program 420 may send a prompt to client access programs 430A and B to determine if client device 404C should be added to the account. In some embodiments, access program 420 may receive information needed to create an account, such as user name, password, computing device serial numbers, IP address, or any other identification characteristics known by a person skill in the art.

Access program 420 receives a threshold proximity for client devices (step 504). In various embodiments, access program 420 receives data from a client access program (e.g., client access program 430A-C) indicating a threshold proximity for computing devices, which share an account for access program 420, to allow the client devices (e.g., client devices 404A-C) access to striped data. In some embodiments, a threshold proximity may be a radius distance from a central point of all devices registered with an account for access program 420. In other embodiments, a threshold proximity may be a distance from one device to another as opposed to a central location. In an embodiment, the location of the client devices may be determined by a global positioning system located on the device. Receiving a threshold proximity is advantageous because it allows a user to determine the restrictions and security levels wanted for client devices associated with an account.

In other embodiments, a threshold proximity may be measured by signal strength of a device or connectivity to a wireless network. In one example, connectivity may be measured connectivity to a wireless personal area network (WPAN). A WPAN is a personal area network which enables connection of client devices via wireless signals, infrared signals, or any other connectivity method known by a person skilled in the art. In some embodiments, access program 420 may receive data from a client access program (e.g., client access program 430A) indicating that a threshold number of devices need to be within a threshold proximity of the other client devices associated with the account before allowing access to striped data. In an example, an account for access program 420 has ten client devices registered; however, only seven of the ten registered client devices need to be within a threshold proximity of one another for access program 420 to allow access to striped data. In one embodiment, the threshold radius may be measure from the client device (e.g., client device 404A) that is requesting access to the striped data.

In yet other embodiments, access program 420 may set or adjust a threshold depending on various factors related to the devices associated with an account for access program 420, such as a location's criminal incidents, news items related to crime in an area, reports of malware, reports of phishing, dangers associated with a social network, the type of devices associated with the account, etc. In some embodiments, access program 420 may determine a probability that striped data will be breached based upon the location of the client devices belonging to the account as well as a location's criminal incidents, news items related to crime in an area, reports of malware, reports of phishing, dangers associated with a social network, the type of devices, etc.

In various embodiments, the threshold proximity, as well as a quorum of devices needed to access striped data, may be set by a user of a client device, a company policy, a third party, a service provider, an administrator of access program 420, etc. In one embodiment, a quorum of devices exists when a preset amount of total client devices associated with an account are within a threshold proximity. In one example, a quorum of devices is met when seven of ten client device associated with an account are within a threshold proximity of one another. In this example, if only six devices associated with the account are within a threshold proximity of one another access to striped data is denied.

Access program 420 receives and stripes data across client devices (step 506). In various embodiments, access program 420 stripes data across the computing devices for an account. In an example, client device 404A creates, downloads, etc. new data, and client access program 430A sends the data to access program 420. Access program 420 receives the new data and stripes the received new data to one or more client devices, which share an account for access program 420 with client device 404A, such as client device 404B. In some embodiments, access program 420 may also store some of the data in database 440. In some embodiments, a client access program (e.g., client access program 430A) may stripe the data to other client devices that share an access program 420 account. In other embodiments, access program 420 may not stripe the data but rather a separate data striping program may stripe data. In yet other embodiments, access program 420 may only verify log in information for access program 420 before striping data across computing devices. Striping data across multiple devices is advantageous because it separates data to different location, thereby requiring a breach to encompass multiple devices in order to obtain coherent data.

Figure 6:
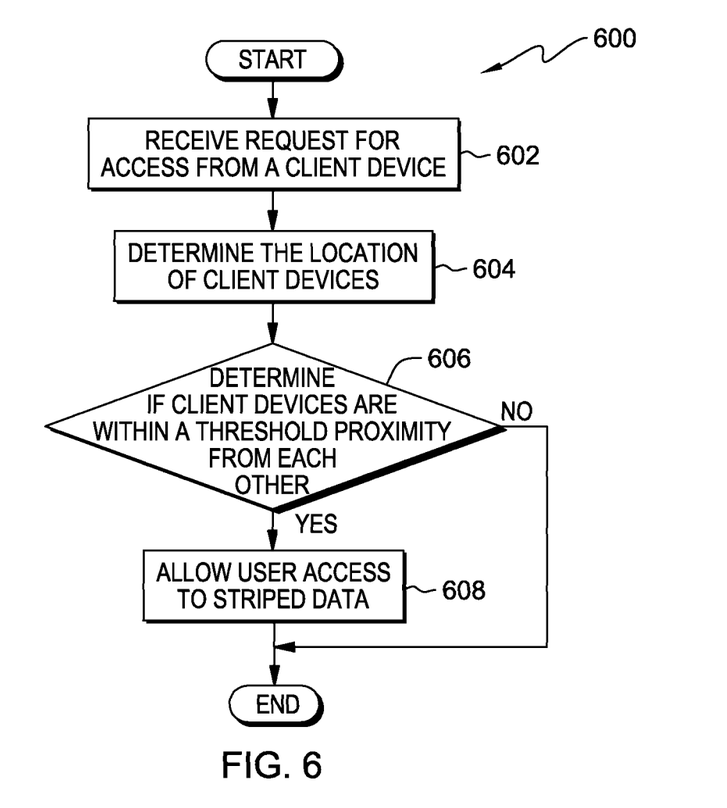
FIG. 6 is a flowchart depicting operational steps of a program, in accordance with an embodiment of the present invention.

FIG. 6 depicts flowchart 600, showing a function of access program 420, in accordance with an embodiment of the present invention. A function of access program 420 represented by flowchart 600 operates on server 402 and determines if a proximity threshold has been met for access to striped data. In various embodiments, the operational steps of access program 420 for flowchart 600 may begin after access program 420 has completed step 506. In other embodiments, the operational steps of access program 420 for flowchart 600 may begin each time access is requested to striped data, which access program 420 oversees.

Access program 420 receives a request for access from a client device (step 602). In various embodiments, access program 420 receives a request for access to striped data from a client device (e.g., client devices 404A-C). In an example, access program 420 receives a request for access to striped data from client access program 430A. In another example, access program 420 receives a request for access to striped data from client device 404A after a user of client device 404A logs into access program 420. In some embodiments, access program 420 may receive a request for access from a server computer which manages a corporate network. In yet another embodiment, access program 420 may receive a request for access to striped data from a client access program, such as client access program 430A.

Access program 420 determines the location of client devices (step 604). In various embodiments, access program 420 identifies the location of client devices belonging to the account for which access was requested. In an example, client device 404A requests access to striped data, which is located in data storage 450A-C. Access program 420 identifies all devices that belong to the account that generated the request (e.g., client devices 404A-C). In various embodiments, access program 420 may receive the geographical location of a client device (e.g., client device 404A) from a client access program (e.g., client access program 430A), a GPS located on the client device, triangulation of cellular towers, Internet protocol (IP) addresses, etc. In these embodiments, access program 420 may store this information and only receive updates if a client device location changes. In some embodiments, access program 420 may not determine the geographical location of a client device, but rather signal strength, or wireless connectivity to a network or to another client device belonging to the same account for access program 420. In some embodiments, access program 420 may not be able to determine the location of all client devices belonging to an account for access program 420. Determining the location of a client device is advantageous because identifying the location of a client device helps to verify the authenticity of a request for striped data.

Access program 420 determines if client devices are within a threshold proximity (decision 606). Access program 420 determines if the client devices (e.g., client devices 404B and C) which are registered to the same account as the client device (e.g., client device 404A) requesting access to striped data, are within a threshold proximity from one another. In an example, all client devices belonging to an account must be within a predefined radius of one mile to allow access to the striped data stored on the devices. In another example, when a request is received by access program 420, access program 420 may recalibrate a preset threshold proximity based on the current location of client devices, and the rate of criminal incidents in the current location. In some embodiments, the number of client devices within a threshold proximity may also determine if access can be granted to striped data. In an example, client device 404A requests access to striped data that is stored on client devices 404A-C. The account for access program 420 that is being requested by client device 404A has a preset of at least two of the three client devices (e.g., client devices 404A-C) must be within wireless communication range of each other (e.g., client devices 404A and B) to enable access to the striped data on all client devices for an account (e.g., client devices 404A-C.) Determining if client devices are within a threshold proximity is advantageous because the threshold proximity is one aspect of the verification of authenticity to the striped data.

In other embodiments, a threshold proximity may comprise devices being a certain distance apart. In an example, if client device 404A requests access to striped data on client devices 404A-C, access program 420 will determine whether the client devices are a threshold distance apart (e.g., two hundred and fifty miles apart). In this example, if multiple devices are stolen, they would have to be separated by large distances to gain access to the striped data. In some examples, a client password and/or encryption may override and/or work in conjunction with access program 420.

In some embodiments, a threshold proximity may be adjusted for portions of the striped data based upon settings and/or levels. In an example, a portion of the striped data may have a high level security setting. In this example, a user may have preset the portion of striped data to a high security level, and access program 420 reduces the threshold proximity devices belonging to an account must be to one another. In another example, access program 420 sets the security level for a portion of striped data based upon the contents of the striped data. In another example, access program 420 may adjust the proximity threshold to a further distance because the security level for the requested portion of striped data was low.

If access program 420 determines that client devices are within a threshold proximity from each other (yes branch, decision 606), then access program 420 allows access to striped data (step 608). In an embodiment, access program 420 determines that a threshold number of client devices from an account for access program 420 are within a threshold proximity from each other. In an example, there are twenty client devices in one account for access program 420, one of which is requesting access to striped data on one or more of the twenty client devices. Access program 420 determines that 15 of the 20 client devices are within wireless range of one another. Access program 420 grants access to the striped data because the account for access program 420 has a preset threshold proximity distances of wireless connectivity range with fifty percent of the client devices registered with the account. In some embodiments, access program 420 allows access to striped data located on one or more of the client devices belonging to an account for access program 420, but the data is still password protected or encrypted. In other embodiments, access program 420 only allows access to the striped data that is within the threshold proximity of the requesting client device.

If access program 420 determines that the client devices are not within a threshold proximity from each other (no branch, decision 606), then access program 420 ends. In some embodiments, access program 420 may determine that the threshold proximity of client devices has not been reached; and therefore, locks striped data located on the client devices. In one example, client devices 404A and B are connected to the same wireless router, but client device 404C is not; and therefore, access program 420 does not allow access to the striped data. In another example, all client devices registered to an account for access program 420 are within a preset threshold proximity of each other, but one or more of the client devices are at or near a location that is determined to be a threat by access program 420. In this example, the client devices are denied access to striped data on the client devices registered to the account for access program 420. In another embodiment, if access program 420 determines that the client devices are not within a threshold proximity of one another, then access program 420 may proceed to step 604. In various embodiment, if access program 420 determines that the client devices are not within a threshold proximity of one another, access program 420 may alert the user of that account that is trying to access striped data.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The computer readable storage medium can be an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In another embodiment, the invention provides a method that performs the process of the invention on a subscription, advertising, and/or fee basis. That is, a service provider, such as a Solution Integrator, could offer to provide authentication verification by receiving files, start bit locations, and a total number of bits. In this case, the server provider can create, maintain, and support, etc., a computer infrastructure, such as computer system 12 (FIG. 1) that performs the processes of the invention for one or more consumers. In return, the service provider can receive payment form the consumer(s) under a subscription and/or fee agreement and/or the service provider can receive payment from the sale of advertising content to one or more third parties.

In still another embodiment, the invention provides a computer-implemented method for authenticating access to secure information. In this case, a computer infrastructure, such as computer system server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system server 12 (FIG. 1) from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for authentication, the method comprising:
    receiving, by one or more computer processors, an indication an account is attempting to access striped data;
    identifying, by one or more computer processors, at least two computing devices that are associated with the account, wherein at least a portion of the striped data is located on at least one computing device associated with the account;

determining, by one or more computer processors, a distance from a first computing device of the identified at least two computing devices to a second computing device of the identified one or more computing devices;

determining, by one or more computer processors, whether the distance from the first computing device to the second computing device is within a threshold proximity;

identifying, by one or more computer processors, the computing devices associated with the account;

determining, by one or more computing devices, whether a preset number of the computing devices associated with the account are within a threshold proximity of one another adjusting, by one or more computer processors, the threshold proximity for the account based on a probability of a data breach; and determining, by one or more computer processors, whether to grant access to the striped data based at least in part on the determination of threshold proximity.

2. The method of claim 1, further comprising:
in response to determining that the distance from the first computing device to the second computing device is within a threshold proximity, granting, by one or more computer processors, access to the striped data.

3. The method of claim 1, further comprising:
in response to determining that the distance from the first computing device to the second computing device exceeds a threshold proximity, granting, by one or more computer processors, access to the striped data.

4. The method of claim 1, wherein determining a distance from a first computing device to a second computing device comprises:
determining, by one or more computer processors, a distance from a first computing device to a second computing device based on whether the first computing device and the second computing device are configured to communicate via a wireless personal area network (WPAN);
wherein the determined distance is within the threshold proximity if the first computing device and the second computing device are communicating utilizing a WPAN; and
wherein the determined distance exceeds the threshold proximity if the first computing device and the second computing device are not communicating utilizing a WPAN.

5. The method of claim 1, wherein adjusting, by one or more computer processors, the threshold proximity for the account based on a probability of a data breach includes:
identifying, by one or more computer processors, the probability of a data breach for striped data on a computing device associated with the account based on a location of the computing device from the account.

6. The method of claim 1, further comprising:
identifying, by one or more computer processors, a security level for a portion of the striped data; and
adjusting, by one or more computer processors, the proximity threshold for the account based on the identified security level for the portion of the striped data.

7. The method of claim 1, further comprising:
in response to determining that the distance from the first computing device to the second computing device is outside a threshold proximity, denying, by one or more computer processors, access to the striped data.

8. A computer program product for authentication, the computer program product comprising:

one or more computer readable storage media and program instructions stored on the one or more computer readable storage media, the program instructions comprising:
program instructions to receive an indication an account is attempting to access striped data;
program instructions to identify at least two computing devices that are associated with the account, wherein at least a portion of the striped data is located on at least one computing device associated with the account;
program instructions to determine a distance from a first computing device of the identified at least two computing devices to a second computing device of the identified one or more computing devices;
program instructions to determine whether the distance from the first computing device to the second computing device is within a threshold proximity;
program instructions to identify the computing devices associated with the account;
program instructions to determine whether a preset number of the computing devices associated with the account are within a threshold proximity of one another
program instructions to adjust the threshold proximity for the account based on a probability of a data breach; and
determining, by one or more computer processors, whether to grant access to the striped data based at least in part on the determination of threshold proximity.

9. The computer program product of claim 8, further comprising program instructions to:
in response to program instructions to determine that the distance from the first computing device to the second computing device is within a threshold proximity, program instructions to grant access to the striped data.

10. The computer program product of claim 8, further comprising program instructions to:
in response to program instructions to determine that the distance from the first computing device to the second computing device exceeds a threshold proximity, program instructions to grant access to the striped data.

11. The computer program product of claim 8, wherein program instructions to determine a distance from a first computing device to a second computing device comprises program instructions to:
determine a distance from a first computing device to a second computing device based on whether the first computing device and the second computing device are configured to communicate via a wireless personal area network (WPAN);
wherein the determined distance is within the threshold proximity if the first computing device and the second computing device are communicating utilizing a WPAN; and
wherein the determined distance exceeds the threshold proximity if the first computing device and the second computing device are not communicating utilizing a WPAN.

12. The computer program product of claim 8, wherein program instructions to adjust the threshold proximity for the account based on a probability of a data breach includes:
program instructions to identify the probability of a data breach for striped data on a computing device associated with the account based on a location of the computing device from the account.

13. A computer system for authentication, the computer system comprising:
one or more computer processors;
one or more computer readable storage media;

program instructions stored on the computer readable storage media for execution by at least one of the one or more computer processors, the program instructions comprising:

program instructions to receive an indication an account is attempting to access striped data;

program instructions to identify at least two computing devices that are associated with the account, wherein at least a portion of the striped data is located on at least one computing device associated with the account;

program instructions to determine a distance from a first computing device of the identified at least two computing devices to a second computing device of the identified one or more computing devices;

program instructions to determine whether the distance from the first computing device to the second computing device is within a threshold proximity;

program instructions to identify the computing devices associated with the account;

program instructions to determine whether a preset number of the computing devices associated with the account are within a threshold proximity of one another program instructions to adjust the threshold proximity for the account based on a probability of a data breach; and determining, by one or more computer processors, whether to grant access to the striped data based at least in part on the determination of threshold proximity.

14. The computer system of claim 13, further comprising program instructions to:

in response to program instructions to determine that the distance from the first computing device to the second computing device is within a threshold proximity, program instructions to grant access to the striped data.

15. The computer system of claim 13, further comprising program instructions to:

in response to program instructions to determine that the distance from the first computing device to the second computing device exceeds a threshold proximity, program instructions to grant access to the striped data.

16. The computer system of claim 13, wherein program instructions to determine a distance from a first computing device to a second computing device comprises program instructions to:

determine a distance from a first computing device to a second computing device based on whether the first computing device and the second computing device are configured to communicate via a wireless personal area network (WPAN);

wherein the determined distance is within the threshold proximity if the first computing device and the second computing device are communicating utilizing a WPAN; and wherein the determined distance exceeds the threshold proximity if the first computing device and the second computing device are not communicating utilizing a WPAN.

17. The computer program product of claim 13, wherein program instructions to adjust the threshold proximity for the account based on a probability of a data breach includes:

program instructions to identify the probability of a data breach for striped data on a computing device associated with the account based on a location of the computing device from the account.

* * * * *